US007702637B2

(12) United States Patent
Terek et al.

(10) Patent No.: US 7,702,637 B2
(45) Date of Patent: Apr. 20, 2010

(54) SYSTEMS AND METHODS FOR FRAGMENT-BASED SERIALIZATION

(75) Inventors: F. Soner Terek, Bellevue, WA (US); Ajay Kalhan, Redmond, WA (US); Nagavamsi Ponnekanti, Bellevue, WA (US); Srikumar Rangarajan, Sammamish, WA (US); Michael J. Zwilling, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 769 days.

(21) Appl. No.: 11/154,496

(22) Filed: Jun. 15, 2005

(65) Prior Publication Data

US 2005/0234868 A1 Oct. 20, 2005

Related U.S. Application Data

(62) Division of application No. 10/821,687, filed on Apr. 9, 2004.

(51) Int. Cl.
*G06F 17/00* (2006.01)
*G06F 7/00* (2006.01)

(52) U.S. Cl. .......................................... 707/100; 707/1

(58) Field of Classification Search .................. 395/611, 395/601, 612; 707/100, 103 R, 1, 101; 709/226, 709/213
See application file for complete search history.

(56) References Cited

U.S. PATENT DOCUMENTS

| | | | |
|---|---|---|---|
| 5,568,639 A | 10/1996 | Wilcox et al. ............... 395/600 |
| 5,634,123 A * | 5/1997 | Bennion ...................... 707/100 |
| 5,727,203 A | 3/1998 | Hapner et al. | |
| 5,768,578 A | 6/1998 | Kirk et al. | |
| 6,012,067 A * | 1/2000 | Sarkar ..................... 707/103 R |
| 6,266,673 B1 | 7/2001 | Hong et al. | |
| 6,904,454 B2 * | 6/2005 | Stickler ...................... 709/213 |
| 7,523,111 B2 | 4/2009 | Walmsley | |
| 2002/0143521 A1 | 10/2002 | Call ............................... 704/1 |
| 2004/0078467 A1* | 4/2004 | Grosner et al. .............. 709/226 |
| 2004/0220946 A1* | 11/2004 | Krishnaprasad et al. ..... 707/100 |
| 2005/0091228 A1 | 4/2005 | Venkatesh et al. ........... 707/100 |
| 2005/0234986 A1 | 10/2005 | Terek et al. | |

OTHER PUBLICATIONS

U.S. Appl. No. 10/775,282, filed Feb. 10, 2004, Venkatesh et al.

(Continued)

*Primary Examiner*—John E Breene
*Assistant Examiner*—Giovanna Colan
(74) *Attorney, Agent, or Firm*—Woodcock Washburn LLP

(57) ABSTRACT

A method and system for fragment-based serialization places one or more object members in fragments. Fragments may comprise a header and a payload. A header can provide useful information about the fragment, such as an indication of fragment type and an indication of fragment length. A payload may comprise one or more members of an object. Primitive members may be stored in a Binary Fragment with a record format payload. LOB and FS members may be stored in fragments that have a Value Type field for setting forth additional properties of the fragment. Collections may be stored in a series of fragments, a first fragment to indicate a start of a collection, one or more second fragments to serialize collection elements, and a Terminator Fragment to indicate the end of a collection. Fragment-serialized objects minimize storage overhead while providing fast instantiation and low-cost location and updating.

16 Claims, 8 Drawing Sheets

OTHER PUBLICATIONS

U.S. Appl. No. 10/776,371, filed Feb. 10, 2004, Carlin et al.
U.S. Appl. No. 10/821,687, filed Apr. 9, 2004, Terek et al.
Berg, C., "How Do I Create Persistent Java Objects?" *Dr. Dobb's J.*, 1997, *22(4)*, 98-101.
Chien, a.A., "Concurrent Aggregates (Ca) — Design and Experience with a Concurrent Object — Oriented Language Based on Aggregates," *J. Parallel and Distributed Computing*, 1995, *25(2)*, 174-196.
Darby, C., "Object Serialization in Java 1.1. Making Objects Persistent," *WEB Techniques*, 1997, *2(9)*, 55, 58-59.
Haverlock, K., "Object Serialization, Java, and C++," *Dr. Dobb's J.*, 1998, *23(8)*, 32, 34, 36-37.
Lim, J.B. et al., "Transaction Processing in Mobile, Heterogeneous Database Systems," *IEEE Trans. on Knowledge and Data Engineering*, 2002, *14(6)*, 1330-1346.
Fuh, Y-C. et al., "Implementation of SQL3 Structured Types with Inheritance and Value Substitutability," *Digital Symposium Collection 2000*, 2000, Abstract only, 2 pages, *www.acm.orgisigmod/disc/p.implementationoyostw.htm*.

* cited by examiner

```
class tPerson
{
    m_name       string;
    m_age        int;
    m_locations  tSetOfAddresses;     // This is a collection or multiset.
};

class tAddress
{
    m_street     string;
    m_city       string;
    m_zip        string;
};

class tEmployee : tPerson
{
    m_empNo      string;
    m_dept       string;
    m_photo      image;
};

Class tPartTimeEmployee : tEmployee
{
    m_hoursPerWeek   int;
};
```

FIG. 3

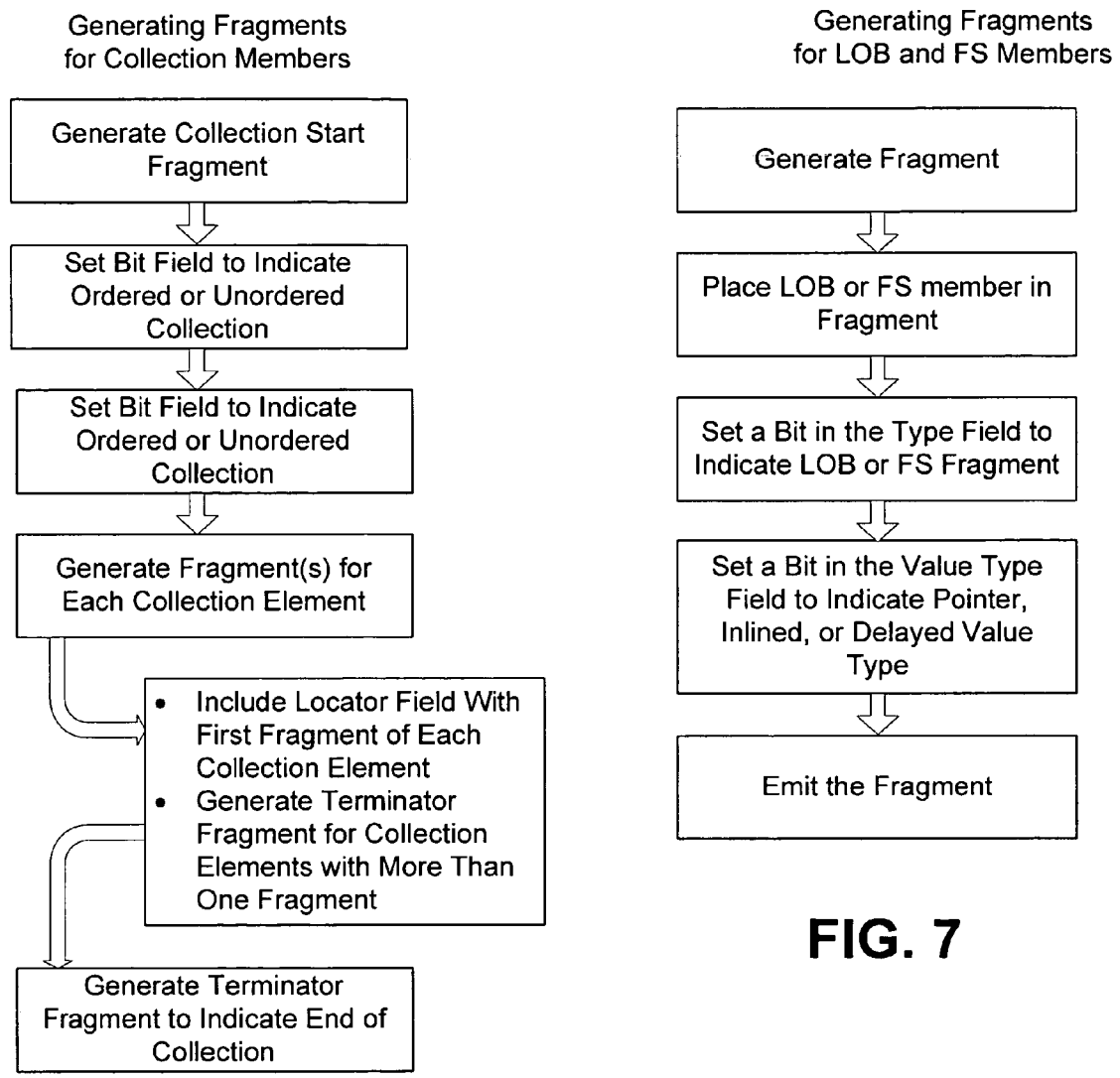

*Metadata for Person Objects*

| Name | Phone # | Address | SS# | Weight |
|---|---|---|---|---|

*Person Object Records*

| Henry | 547-5268 | 2 N. 53rd St. | 383-99-9876 | 230lbs |
|---|---|---|---|---|
| Margaret | 549-9254 | 4 N. 67th St. | 398-74-4565 | 160lbs |

*(Prior Art)*
FIG. 10

| Type (1byte) | Length (2bytes) | Payload – SE Record |
|---|---|---|

⇐ FIG. 11(A)

| Type (1byte) | Value Type (1 byte) | Length (2 or 8 bytes) | Payload – LOB, Pointer, or Cell Reference |
|---|---|---|---|

⇑ FIG. 11(B)

| Type (1byte) | Value Type (1 byte) | Length (2 or 8 bytes) | Payload – FS, Pointer, or Cell Reference |
|---|---|---|---|

⇑ FIG. 11(C)

| Type (1byte) |
|---|

⇐ FIG. 11(D)

| Type (1byte) | Bit field (2bytes) |
|---|---|

⇐ FIG. 11(E)

| Type (1byte) | Length (2bytes) | Locator (4bytes) | Payload – Collection Element |
|---|---|---|---|

⇑ FIG. 11(F)

| Type (1byte) |
|---|

⇐ FIG. 11(G)

| Type (1byte) | Locator (4bytes) |
|---|---|

⇐ FIG. 11(H)

Binary Fragment for tPerson

Binary Fragment for tEmployee

Binary Fragment for tPartTimeEmployee

Terminator for tPerson

FIG. 12

SYSTEMS AND METHODS FOR FRAGMENT-BASED SERIALIZATION

CROSS REFERENCE

This application is a divisional of U.S. patent application Ser. No. 10/821,687, filed Apr. 9, 2004, now pending, which is hereby incorporated by reference in its entirety.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright©2003, Microsoft Corp.

FIELD OF THE INVENTION

This invention relates to computing, and more particularly to storage and transmission of data objects.

BACKGROUND OF THE INVENTION

Serialization can be defined as the process of storing the state of an object instance to a storage medium. During this process, the public and private fields of an object and the name of the class, are converted to a stream of bytes, which is then written to a data stream. When an object is subsequently deserialized, an exact clone of the original object may be created.

Consider an object in active computer memory, for example, an object with data describing a person. The person object has a number of subcomponent members, such as name, address, social security number, phone numbers, spouse, height and weight. While the person's name may be important for a particular application, the height and weight may not be. Thus, the name may remain in active memory where it may be modified, while other fields such as height and weight are evicted from active memory to make room for other data. Ultimately, the person object may no longer be needed by the application, and it may be persisted or transmitted to another computer. To persist or transmit an object, the object must be serialized, which refers to formatting an object in a useful, retrievable way.

In the example above, the members of an object, such as the person object, are generally uniform for all objects of the same class. Each person object, for example, has the name, address, social security number, phone numbers, spouse, height and weight members. The information changes from person to person, and for some people the information may be unavailable ("null"), but the existence of the same member fields is generally present for all person objects of the person class. As such, a person class may be thought of as the generic person object. A person object is one instance of a person class. This concept of a class and an instance of a class exists in many programming languages. Regardless of the programming language involved, serialization is typically performed on instances of a class, generating serialized objects.

Objects may comprise members with various types of data. The members may be primitive or complex. Examples of primitive members are "string" such as the name member from the person object, which is a string of letters; and "integer," such as the social security number from the person object, which is an integer. Examples of complex members are "collection," such as the phone numbers member, which comprises more than one primitive—in this case, more than one integer; "nested," which is a member that has some structure beyond a simple primitive member, e.g., the collection of phone numbers, or the spouse member, which refers to another person object; and "subtype," such as a hypothetical "United States address" type that would be a subtype of an address type, and therefore presumably declares additional members such as a U.S. region or U.S. Post Office Box. Members may be described in many different ways, and relate to each other in any number of patterns. Therefore serializing objects such as the person object involves effectively dealing with the various members and the relationships of those members that may be included in the object.

Serialization of objects presents a number of challenges in the industry. Serialized objects should consume as little storage space as possible. If the size of an object is greatly increased when it is serialized, then the storage cost of the object may be too high. Therefore, compact representation is an important aspect of a serialization format.

Serialized objects should also be efficiently instantiated into active memory. If the processing cost of finding and assimilating the various members of a serialized object is high, it will drain valuable processor resources. Likewise, serialization should allow for instantiation and updating of members of an object without the need to instantiate the entire object security number is a waste of active memory resources needed to store the name, phone number, address, etc. when those members are not involved in the operation.

Serialization formats should also support all data types that may be contained in an object. A very basic serialization format might only support primitives, but more sophisticated formats should support complex members such as the nested members, collection members, and subtype members described above. While a serialization format should be optimal for objects with few levels of nesting and inheritance, because most objects have this characteristic, it should also support many levels of nesting and inheritance to ensure that the serialization can be flexibly used for a broad range of classes. A serialization format should also be flexible in handling very large members. Some members may be, for example, a music file, a photograph, or a movie, and such large members pose a challenge in serialization that will be explained in greater detail below.

Previous serialization formats have several notable deficiencies. One such format is known as XML Serialization. XML serialization provides a token for each member. The token comprises metadata that identifies a member, usually a member immediately following the token. Therefore, XML serialization may be visualized as follows:

(token 1) Member 1; (token 2) Member 2; (token 3) Member 3; etc.

The problems with such a serialization format are, first, verbosity: the storage of metadata tokens with each and every member consumes a large amount of disk space. Second, retrieval is impaired in such a format, because in order to find a desired member, the tokens must be searched. This may involve a high active memory cost, because the most effective way to read or update an object that is serialized in this manner may be to instantiate the entire object.

Another serialization format is in the "Storage Engine record" format, also referred to as the "SE record," or simply "record" format. This is an a typical database system record format. In this serialization format, members for objects of a given class are stored in uniformly formatted records. Instead of providing metadata that describes each and every member, there is metadata that describes the contents of all the records for objects of a particular class. This can be visualized as provided in FIG. 10.

The SE record serialization format does not require metadata with each individual member, so it is a more compact serialization technique. Instead, it requires access to metadata describing the layout of the members on disk, such as the Metadata for Person Objects table of FIG. 10. A weakness of the SE record format is that it is inflexible in handling members of variable length, such as many of the music files, movies, and images that are stored with objects today. More accurately, flexibility in the SE record serialization comes at a high processing cost. Members of variable length can be stored in such a format, if an offset table is used to identify the locations of variable length data in the record. The consequence of storing an offset table is that whenever a variable length member is updated, the positions of all variable length data that follows it must be adjusted. This can be compared to inserting bytes in the middle of an array—everything to the right of an insert point must be shifted right to make space for inserted new bytes.

Further, various storage formats have been designed to allow users of databases to efficiently store objects within a database. These storage formats can be better supported with a more flexible serialization format. For example, should be distinguished from the serialization format provided herein. For example U.S. patent application Ser. No. 10/692,225, titled "system and method for object persistence in a database store," is directed to allowing a user to 'import' classes and methods written in an object oriented language like C# into a database. It further allows a user to store C# objects in a database and to invoke methods on the objects. It provides multiple flavors of persistence to a user. A user can define his own serialization format, use Common Language Runtime ("CLR") serialization (provided by C# language itself), or let the SQL server store an object in its own format. These options, particularly the latter, provide a performance advantage, as MICROSOFT SQL SERVER® can retrieve or update some fields of an object without actually instantiating a C# object. Of course, some operations, such as method invocation, still require instantiation of a C# object.

Similar background and related technology descriptions may be found in U.S. patent application Ser. No. 10/692,227, titled "System and Method for Storing and Retrieving a Field of a User Defined Type Outside of a Database Store." This application discusses filestreams in UDTs, which may be serialized according to the techniques described herein. Such advanced database technologies can benefit from a more flexible and higher performance serialization format. Likewise, improved techniques for performing operations on serialized objects would better support such advanced database technologies.

The trade-offs involved in serialization formats are thus metadata on-disk memory overhead of the format, versus active memory overhead of locating a member, versus processing cost of locating a member, versus cost of doing an update, versus flexibility in handling large fields. In light of these trade-offs, there is an ongoing and heretofore unaddressed need in the industry to raise the bar with respect to serialization techniques.

SUMMARY OF THE INVENTION

A method and system for fragment-based serialization places one or more members in fragments. Fragments may comprise a header and a payload. A header can provide useful information about the fragment, such as an indication of fragment type and an indication of fragment length. A payload may comprise one or more members of an object. Various fragment types are provided for efficiency and flexibility in storing and retrieving object members. Primitive members may be stored in a fragment with a record format payload. This configuration allows for fast location and updating of primitives. Large Object ("LOB") members may be stored in fragments that have a field for setting forth location types for locations of LOB and FS members. Collections may be stored in a series of fragments, a first fragment to indicate a start of a collection, one or more second fragments to serialize collection elements, and a terminator fragment to indicate the end of a collection. These and other fragment types may be organized according to rules that govern generating fragments, placing members in fragments, and sequencing fragments in a manner that provides additional functionality to the serialization format.

BRIEF DESCRIPTION OF THE DRAWINGS

FIG. 3 presents several exemplary object classes for which fragment sequences are provided in the description, in accordance with various embodiments of the invention.

FIG. 6 is a flowchart demonstrating steps for generating fragments for collection members of an object.

FIG. 7 is a flowchart demonstrating steps for generating fragments for the LOB and FS members of an object.

FIG. 10 illustrates a prior art record serialization format in which metadata is provided for all records, and corresponding data conforms to the format specified in the metadata.

FIGS. 11(A-H) illustrate various fragment types for use in serializing data in accordance with preferred embodiments of the invention.

FIG. 12 is a top-level diagram of a fragment sequence for the tPartTimeEmployee object displayed in FIG. 3. This fragment sequence may contain additional fragments for each level of nesting.

DETAILED DESCRIPTION OF ILLUSTRATIVE EMBODIMENTS

Certain specific details are set forth in the following description and figures to provide a thorough understanding of various embodiments of the invention. Certain well-known details often associated with computing technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

It is an object of the invention to provide a method and system for improved object serialization, as well as to provide techniques for operations on serialized objects. In this regard a serialization that provides compact representation is provided. Objects serialized in the provided format can be efficiently instantiated into active memory, thereby reducing processing costs of finding and assimilating the various members of a serialized object. Likewise members of objects may be instantiated and updated without the need to instantiate an entire object. Moreover, support for a wide range of data types, including user-defined data types ("UDTs") is provided. The serialization format can be optimized for objects with few levels of nesting and inheritance but also supports many levels of nesting and inheritance. It is flexible in handling very large members. The invention can provide a serialization format that is suitable for storage of various types in a single column—for example, an instance of an "employee" object that is a subtype of a "person" object can be stored in a column that is provided to store only "person" objects. Finally, the serialization format allows for efficient addition of new members to a type, also called efficient type evolution.

Fragment-based serialization in accordance with various embodiments of the invention can be conceptualized as a hybrid format that employs some of the elements of XML-style serialization, as described in the background, and some of the elements of SE record serialization, also described in the background, in addition to numerous aspects and advantages that are unique to fragment-based serialization itself. In this regard, the members of an object can be placed into fragments. Fragments are displayed in FIG. 1.

Figure 1:
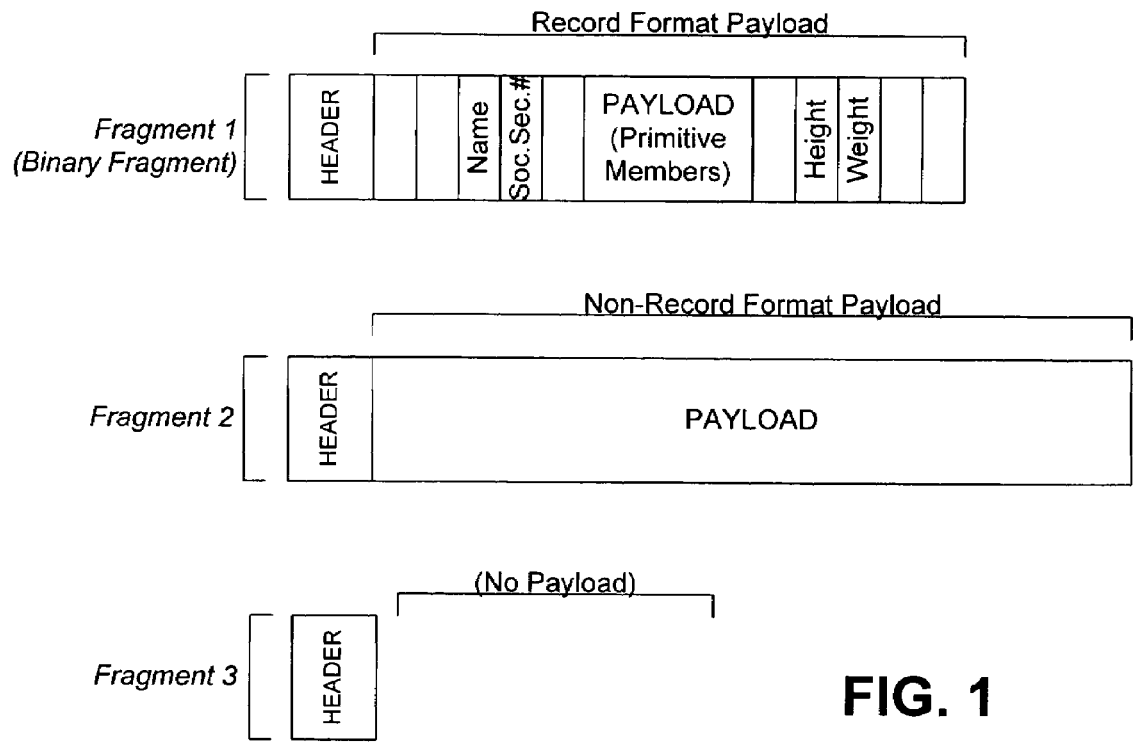
FIG. 1 is a conceptual illustration of the various fragments which may be used to serialize object members. It shows a Binary Fragment with a payload comprising primitive members in record format, a fragment with a non-record format payload, and a fragment with no payload.

With reference to FIG. 1, a fragment may comprise a header and in some cases a payload. The header can provide useful information about the fragment, such as an indication of a fragment type, and an indication of a fragment length. This header is somewhat similar to the tokens provided by XML serialization, because a new header is given for each fragment, just as a token is provided for each member in the XML serialization context. However, while XML tokens are provided for each member, the fragments of FIG. 1 can include more than one member. This is illustrated in fragment 1, which shows a fragment with a payload comprising several data members. Fragment-based methods can serialize and deserialize a variety of data structures including but not limited to: objects with simple primitive fields (integers, strings, etc), entire graphs of connected objects, and collections.

The fragment payload can comprise a member or members of a serialized object, as well as any other data. This payload can employ SE record format-style serialization for the members inside, which allows for speedy retrieval of members in the payload. Such a record format payload is a characteristic of Fragment 1 in FIG. 1. In this regard, the fragment-based serialization has features of SE record serialization. Metadata can be provided in a header or elsewhere that describes the fields included in a payload. The corresponding advantages of compact representation and retrieval of individual members without instantiating an entire object can therefore be achieved. Note that while a payload can be in record format, it need not be, as is illustrated in Fragments 2 and 3.

Figure 2:
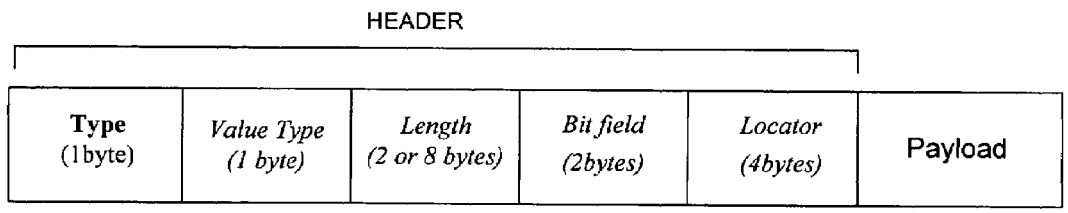
FIG. 2 presents a fragment with a detailed view of the fragment header. The header shows a selection of potential fields for use in fragment headers, and many fragment headers may omit some of the fields shown.

The header portion of a fragment may contain various fields, as illustrated in FIG. 2. FIG. 2 shows a fragment with an expanded header section so the various possible fields may be illustrated. Note that the various fields provided in FIG. 2 need not be included in every fragment. Instead, the fields that provide useful information for the payload of the fragment may be included in the header. The various fields of FIG. 2 will be explained in greater detail below, in connection with the description of various suggested types of fragments.

Various embodiments of the invention utilize multiple types of fragments for additional versatility in serializing objects. A variety of suggested fragment types is set forth below. Before describing the fragment types, however, consider the motivation for using different fragment types. One motivating factor is to allow for better serialization of the various types of members that may make up an object. Recall from the background section that objects frequently comprise multiple members of different types. These members may be, for example:

Small primitive members. These are members of basic types such as integer ("int"), float, and string.

Large primitive members such as Large Object ("LOB") and FileStream ("FS").

Complex members, such as Collection, and Nested

Subtype members. Any class that supports inheritance may have instances of the class that include an inherited member, which in turn may be data of a subtype.

The above is a non-exhaustive list of potential member types, and all member types are considered candidates for use with the fragment-based serialization techniques described herein.

Fragment Types

In order to accommodate various types of members that may exist in an object that is serialized, the invention can be used with several fragment types. One or more fragment types may be useful for only one type of member, while other fragment types are useful for multiple member types.

The various fragment types can have different formats that are tailored to the contents of the fragment. In the following discussion, a fragment type is first set forth, followed by a visual depiction of a suggested fragment format for that type. Fragment attributes in italics are optional and depend on the value of the Type column. The invention is not limited to the fragment types set forth below. In addition to the fragments provided here, new fragment types may be developed for use in accordance with the general principles of fragment-based serialization provided herein.

Binary Fragment—FIG. 11(A) displays various potential embodiments of a Binary Fragment. This fragment can contain a Type, Length, and Payload field. The type field may be just one byte, or it can be any number of bytes. Additional bytes in the Type field will require additional memory overhead when using the serialization format. Therefore bytes in header fields should be used sparingly. In this regard, a one-byte Type field can include a number of bits for use in indicating various properties of a fragment. One bit may be used to indicate that a fragment is a Binary Fragment. Another bit may be used to indicate a type of member or members contained in the fragment. For example, if all members are primitive, a bit may be set to indicate such information. If the members are subtype members, a bit may be set to so indicate. If the Binary Fragment is the first, or the only, fragment for a serialized object, A bit in the Type field may so indicate. The type field may also indicate an object type contained in a fragment or fragments, as well as any additional useful information such as the number and types of fragments in the entire object.

Objects represented with in a single binary fragment may be flagged in the Type field as "self-terminating" fragments, eliminating any need to include a Terminator Fragment at the end of a serialized object. This "self-terminator" flag may be in the form of a self-terminator bit in the Type field of a fragment. Such a self-terminator bit could also be located in any other field of a fragment header, or in a fragment payload. Objects that are represented by multiple fragments need not set the self-terminator bit, because a Terminator Fragment can be generated to mark the end of the serialized object.

The Length field is optimally 2 bytes, although the length may vary as described above. The Length field may be used to indicate a length of a payload. The payload in a Binary Fragment may contain any data. In preferred embodiments, the payload contains all primitive members of an object. The payload in such a fragment can be an SE record, to allow for efficient cracking and updating of the primitives or other members stored therein.

LOB Fragment—FIG. 11(B) displays various potential embodiments of a LOB Fragment. This fragment may have Type, Value Type, and Length fields in the header, and a payload containing a LOB or location information for a LOB. The Type field, as in each of the fragments, need only be one byte, indicating in this case that the fragment is a LOB Fragment. The Value Type field may provide additional means to describe the contents of the LOB Fragment. Such a Value Type field may be added to contain information about LOB attributes in implementations where it is not desirable to use up bits in the Type field for LOB attributes. This way, only LOB Fragments have the overhead (here, an additional one byte per fragment).

Information stored in the Value Type field can describe a type of location in which a LOB is stored. Allowing additional description of the location of LOB members provides flexibility in handling large values. When LOB data (in contrast to a LOB reference) is stored in LOB fragment, an application (or user of a computer) can initiate the generation of a LOB Inlined type fragment, use an 8 byte length, and put the LOB inline. In other words, the LOB can be placed in the payload of the LOB Fragment. If the Value Type field indicates a LOB Inlined type, the length field can be, for example, 8 bytes and the payload can contain a LOB value.

It may not always be desirable to include a LOB inlined with a serialized object. This is because a LOB can take up an large amount of space. Therefore, the Value Type field can indicate a LOB Pointer type, meaning that the payload of the fragment contains a pointer to a LOB location. In this scenario, the Length field can be, for example, 2 bytes, and the payload can contain a LOB reference. The Value Type field can also indicate a LOB Delayed type which can mean that the fragment payload contains a LOB reference to a cell in a database that presumably contains a LOB. In this alternate scenario, the fragment length can be, for example, 2 bytes and the payload can contain a cell reference. A 'cell reference' is a combination of a table identifier, a row identifier, and a column identifier. When combined with a 'path' (as described below) for a LOB fragment, a cell reference gives enough information to locate actual LOB data. Any other location type information can be contained in the Value Type field of a LOB or FS fragment. Providing such an additional location type field for LOB and FS Fragments gives the serialization format additional flexibility while keeping overhead low.

Note that any of the fragments discussed herein may be null if a particular object does not have a member that is provided for in a serialization for a particular class. If a fragment is null, this information can be set in a bit in the type field for the fragment. In this regard, the Length field and the payload may be removed from the LOB fragment of FIG. 11(B) to form a Null LOB Fragment with any location specified in the Value Type field.

FS (File Stream) Fragment—FIG. 11(C) displays various possible embodiments for an FS Fragment. As with all fragments, the FS Fragment can have a Type field that indicates a fragment type—here, an FS Fragment. Like the LOB Fragment, the FS Fragment can include a Value Type field. Once again, this field can indicate various location types for an FS. The FS could be serialized with the rest of the object, or Inline type (again, this can correlate to a larger length field, e.g., 8 bytes). It could be in a location that is pointed to in the fragment payload, FS Pointer type, which in the context of an FS, may indicate a length field of, for example, 2 bytes and a payload that contains a Global Unique Identifier ("GUID") for the appropriate FS file. The Value Type field could also indicate an FS Delayed location type, which can correlate to a length of, for example, 2 bytes, and a payload that contains a cell reference.

Terminator Fragment—FIG. 11(D) shows various possible embodiments for a Terminator Fragment. In the preferred implementation of fragment-based serialization, only the Type byte is relevant for the Terminator Fragment. This is because the function of the Terminator Fragment is to mark the end of a serialized object, or to mark the end of a collection or other set of related fragments within a serialized object. The Terminator Fragment can perform this function with a Type filed indicating that it is a Terminator Fragment, and need not include additional information. However, it may be useful to include some additional information with the Terminator Fragment, and such embodiments are certainly within the scope of the invention described herein.

Collection Start Fragment—FIG. 11(E) displays various possible embodiments for a Collection Start Fragment. This fragment may contain a Type field and a Bit field of, for example, 2 bytes. The Type filed may indicate that the fragment is a Collection Start Fragment. The Bit field may indicate properties of a collection. For example, the bit field may indicate an "unordered" collection, which can correspond to a collection that is not in any particular order. It could also indicate and "ordered" collection, indicating that a collection is in a particular order. This fragment, when used only for the purpose of describing a collection, can omit the length field, because the Collection Start Field marks the start of a collection, and as such need not contain a payload. If there is a payload included with the Collection Start Fragment, it could have a length field to describe that payload. However, in the preferred embodiments described herein, the Collection Start Fragment is used to mark and describe a collection, it does not have a payload of its own and therefore need not have a length field either. As such, a Null Collection Start Fragment will look very much like the Collection Start Fragment in FIG. 11(E). The only difference in the situation where the Collection Start Fragment is null is the bit set in the Type field, as described above in connection with Null LOB Fragments.

Collection Element Fragment—FIG. 11(F) displays various possible embodiments for a Collection Element Fragment. The Type field in such fragment can indicate that it is a Collection Element Fragment. The Length field can indicate a length of the payload of the Collection Element Fragment. FIG. 11(F) shows an exemplary Length field size of 2 bytes, which should be sufficient to indicate the length of a payload containing a collection element.

A Locator field may also be included with Collection Element Fragments. The Locator field, like the Value Type field from the LOB and FS fragments, can be used to indicate additional properties of a Collection Element Fragment. For example, Collection Element Fragment may have a payload in SE record format, such as that of the Binary Fragment. The Type field may indicate whether the Collection Element Fragment is a Self-Terminator, by using a bit to indicate whether a fragment terminates itself. If the self-terminator bit is not set, the system can anticipate a Terminator Fragment for the fragment. The Locator field can be used to address a particular element of a collection very much like the GUID of a FS fragment. In the case of a Collection Element Fragment, however the locator field indicates a unique location within a collection and not necessarily a globally unique location.

Regarding the Locator field, it may also be preferable to allow for some anticipation of a locator field in a collection element. A the bit in the Bit field of the Collection Start Fragment may be set to indicate an upcoming Collection Element Fragment with a Locator field. In such a configuration, the system can be configured to deduce that Locator field is present in the Collection Element Fragment.

Null Collection Element Fragment—FIG. 11(H) displays various possible embodiments for a Null Collection Element Fragment. Null representation for Collection Element Fragments may contain a Type field indicating that the Fragment is a Null Collection Element Fragment. They may also contain a Locator field, but need not contain the Length or payload fields, because the existence of the Null Collection Element Fragment indicates that the particular serialized object does not have data corresponding to a particular aspect of a class that is otherwise designed to contain such data. Again, when no members or other member information are included in a payload, there may be no need for a Length field to describe the length of the payload.

Null Fragment—FIG. 11(G) displays various possible embodiments for a Null Fragment. The Null Fragment, like the Terminator Fragment, can be represented by a single Type field. Again, this is practice may be restricted to representation of non-collection element null fragments. See below for a description of Collection Element Null Fragments.

Annotation and Metadata Fragments—In addition to the other fragments described above, Metadata and Annotation Fragments may be used to describe one or more fragments to a receiver of a serialized object. Such fragments are useful in a variety of situations even though they may not be necessary to deserialize an object. For example, a annotation fragment may allow a client to check information about a particular member or object, or to insert notes or information about a serialized object.

In conclusion, with reference to the descriptions of various fragment types set forth above, one of the advantages attained by an effective serialization format is a reduction in representation overhead. Representation overhead refers to an amount of additional information stored with an object to allow the object to be effectively retrieved. The fragment-based serialization techniques do contain representation overhead, but the overhead is minimized for the corresponding flexibility and functionality of the format.

The first field in a fragment header is the Type field. In preferred embodiments, the Type field consumes 1 byte. This minimizes the associated overhead. In addition, the Locator field associated with the Collection Element Fragment amounts to overhead. Most small unordered collections can be adequately represented in a Locator field that consumes no more than 4 bytes. Larger, ordered collections may consume more than 4 bytes, however, and in this case the Locator field may be replaced with a variable binary ("varbinary") field that may require more representation overhead. The exact amount of overhead used by the Locator field is considered an implementation detail and is left to the judgment of those skilled in the art, who will appreciate the motivation to reduce representation overhead, but also allow for flexible serialization of collections. Finally, the Length fields associated with several other fragment types (see above) are representation overhead. As described above, the Length field in preferred embodiments can be either 2 bytes or 8 bytes long, depending on the fragment type. The invention is not limited to the exact number of bytes for such fields, and the parameters set forth herein should be considered useful tips from an experienced practitioner and not hard and fast requirements for the invention itself.

Rules for Placing Members in Fragments

As explained above, the various fragment types may serve a variety of fragment members. To serialize an object, a decision must be made as to which fragment type to use for a particular member. An object containing, for example, the primitive, nested, collection, and subtype members can be decomposed into fragments according to a set of rules. While the invention is not limited to a particular correlation of fragment types and member types, a useful set of rules has been developed and is explained in this section. Note that the rules are for clarity of explanation, not to indicate that they must be carried out in a particular order. In practice, the operations corresponding to the rules below may be carried out simultaneously, with the generation, population, and sequencing of fragments conducted as a processor steps through the members of an object. For an exemplary application of these rules to the serialization of an object, refer to FIG. 3 and corresponding text, below. The rules are as follows.

Generate Fragments. Embodiments of the invention can be said to engage in type-based container relative fragment generation. In other words, there may be a fragment for each of the following:

Each level of nesting in a class, even if the level is null.
Each collection, even if the collection is null.
Each element of a collection.
Each subtype.
Each LOB and FS attribute. Even if it is null. LOB values may be stored inline, while FS values should be stored out-of-line.

Additional fragments may be generated to suit the needs of a particular class. Likewise, the above fragments may not be required for serialization of some classes.

In general, an object may be translated into a fragment-based serialization fragment using a top-to-bottom technique. First, any base type members in an object may be serialized, followed by subtypes. At every nesting level, a scan may be made of the contained members to determine if there are any nested types, subtypes or LOB/FS type members.

Figure 4:
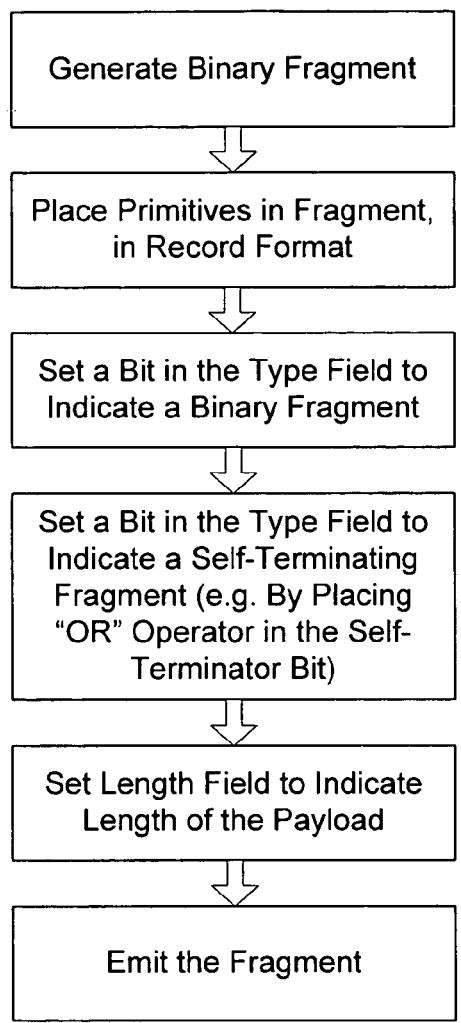
FIG. 4 is a flowchart demonstrating steps for generating fragments for the primitive members of an object when there are no nested members in the object.
Figure 5:
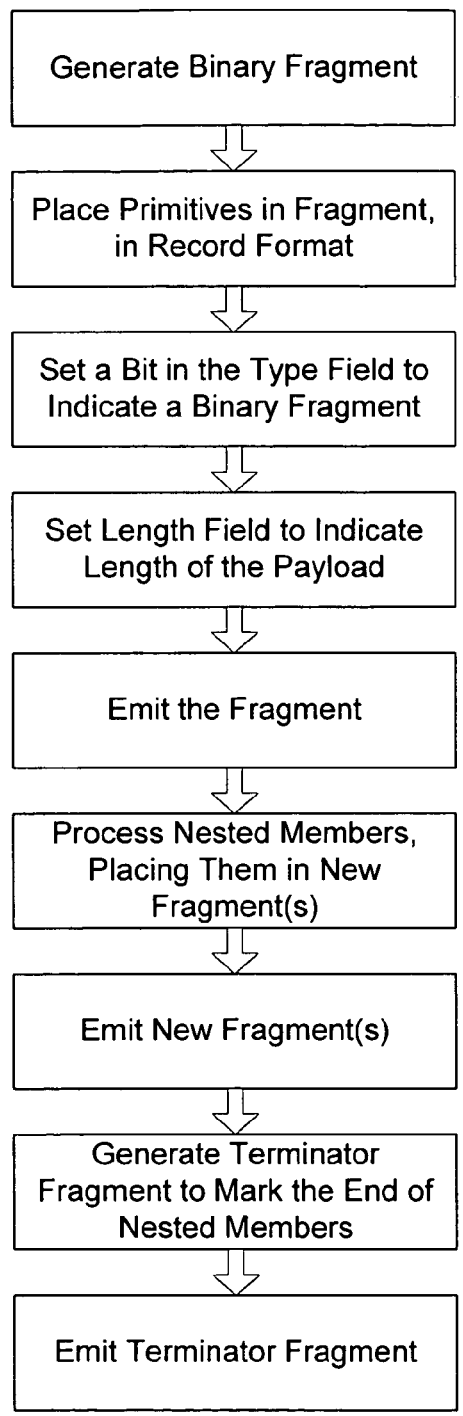
FIG. 5 is a flowchart demonstrating steps for generating fragments for the primitive members of an object when there are nested members in the object.

Generating Fragments for Primitive Members. Some or all primitive members may be placed into one or more Binary Fragments. A preferred embodiment handles objects with no nested members differently from objects with nested members. These two scenarios are depicted in FIG. 4 and FIG. 5. In both situations, the non-nested primitives may be placed inside a single Binary Fragment, and serialized therein using an SE record format. For objects without nested members, a Binary Fragment may be generated and an indication that there are no nested members can be placed in the Type field of the fragment. In various embodiments, the practical difference between objects containing nested members and objects not containing nested members may be that objects with nested members can be serialized into multiple fragments, while objects without nested members may be serialized into a single binary fragment. Therefore, if there are no nested members, a self terminator bit can be set in a field of a binary fragment. The Length field in the Binary Fragment may be set to correspond to the length of the combined primitive members. The fragment can then be emitted.

With reference to FIG. 5, if there are nested fragments, the process for no nested members with respect to the Binary Fragment can altered somewhat to allow the nested members to be recursively serialized. In this situation, the self-terminator bit need not be set. After the Binary Fragment is emitted, the nested type members may be recursively processed into fragments of their own. On return from such a recursion, a Terminator Fragment may be generated. The Terminator Fragment may then be also be emitted.

Generating Fragments for Collections. A flowchart of the process for generating collection fragments is provided in FIG. 6. When a collection member is encountered, a Collection Start Fragment can be generated. If the collection is not ordered, the bit in the bit-field may be set to "unordered." Each element of the collection may then be recursively serialized by generating Collection Element Fragments, described below. After all the elements have been serialized, a Terminator Fragment can be generated to indicate the end of the collection.

A collection element can be serialized into of one or more fragments. If a collection element is represented using more than one fragment the representation may have its own Terminator Fragment. The first fragment of a collection element may include a Locator field. One purpose of such a filed can be to keep track of a number of elements processed when serializing a collection. By incrementing a counter in a Locator field to properly indicate a current element for serialization, the serialization process can return to the proper location for serializing the next element of a collection.

Generating LOB and FS Fragments. A flowchart illustrating the generation of fragments for LOB and FS members is provided in FIG. 7. As indicated in the description of various fragment types, both the LOB and FS Fragments may be configured to indicate more than one location type for the corresponding payload. This indication may be made in a Value Type field. For example, the Value Type field may describe a payload as comprising pointer, inlined, or delayed location types. In generating the LOB and FS Fragments, the appropriate value type can be determined from a member. For example, if a LOB is to be serialized with an object, i.e. stored inline with a fragment, then the value type for a LOB Inline can be selected and the LOB can be serialized accordingly. If instead the LOB is stored in a cell of a database an not with the serialized object, a LOB reference can be serialized with the object, and the appropriate location type can be stored in the Value Type field. The fragment can then be emitted.

Generating Subtype Fragments. Subtype Fragments may be generated in the same manner as the fragments for any other non-primitive member. In other words, if the Subtype comprises a collection member, a Collection Start Fragment along with any Collection Element Fragments and a Terminator Fragment may be generated to mark the end of the serialization of the subtype member. If the subtype member is a nested LOB member, a LOB Fragment may be generated to contain the subtype member. A binary fragment is generated for the subtype, which includes all small primitive members in the subtype, such as int, float etc, in a similar manner as binary fragment is generated for the base type.

Generating Other Fragments. The techniques described herein may be extrapolated to the generation of any other fragments that may be desired or required for the serialization of a particular object or class of objects.

Figure 8:
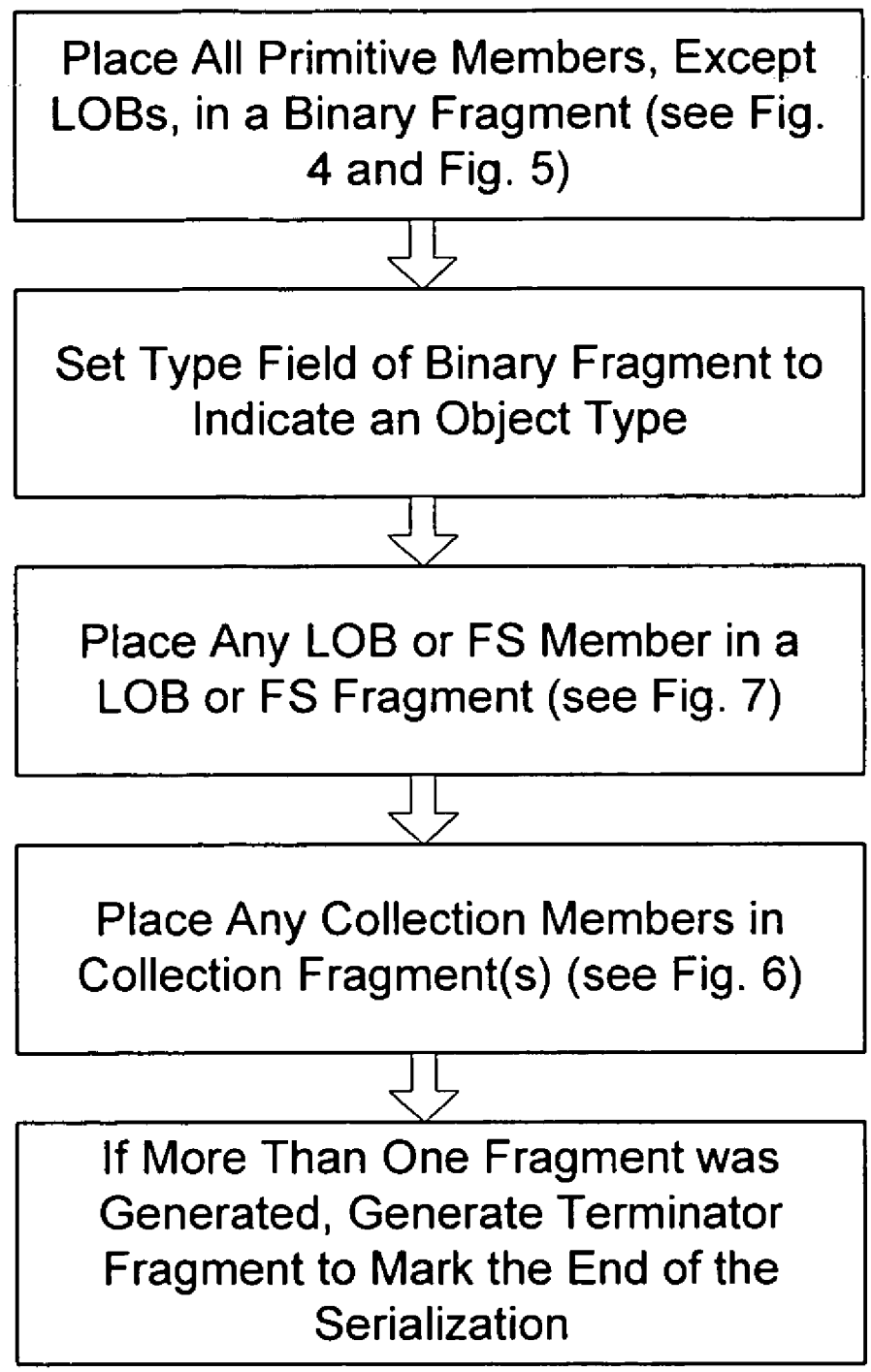
FIG. 8 is a flowchart demonstrating steps for the process of placing an entire object, with members various types, into fragments.

Populate Fragments. While the fragments may actually be generated and populated at the same time, it is useful for purposes of explaining this aspect of the invention to include an overall plan for how fragments are populated. This overall plan is provided in FIG. 8. In placing members into the various fragment types, the following suggestions may be observed:

All primitive members, excluding LOB members, can be stored in a Binary Fragment. The header of this fragment can contain a type identifier for entire object. The payload of this fragment can include a storage engine record. A fragment is said to terminate itself if it only contains primitive attributes.

Each LOB member can be stored in a LOB Fragment.

A Collection Start Fragment can be generated for each collection member. If the collection member is not empty, the Collection Start Fragment can reference one or more Collection Element Fragments.

A Collection Element Fragment provided for the various elements of a collection member. This fragment can be a Binary Fragment with a locator. A locator is a label by which a collection element can be addressed.

A Terminator Fragment can be generated for each collection member that was decomposed into more than one fragment. The Terminator Fragment marks the end of the collection member.

A fragment which has nested fragments doesn't terminate itself. Instead it has a Terminator Fragment which appears after all the fragments that are nested within the fragment.

A Terminator Fragment can be generated for each object that was decomposed into more than one fragment. The Terminator Fragment can mark the end of a serialized object.

A nested object can follow the same rules as above recursively.

For the purposes of serialization, subtypes may be treated as nested objects.

Sequence of Fragments. Fragments are stored in a sequence that makes up a serialization for any particular class. If a class of objects contains only primitive members, the objects can be serialized into a self-terminating single fragment. Classes with complex or other non-primitive members, can be serialized into more than one fragment. If a serialization for a class comprises more than one fragment, then one or more Terminator Fragments can also be generated. The set of fragments from the starting fragment to the final Terminator Fragment comprises the sequence of fragments as that term is used in this description.

Fragments corresponding to subtypes in an instance may be nested under a fragment for the base type. Using the tPerson, tEmployee and tPartTimeEmployee example from FIG. 3 and presuming for the moment that at each level there are only primitive attributes described by Binary Fragments, an instance of tPartTimeEmployee can be visually depicted in the diagram provided by FIG. 12. Note that fragments for tEmployee and tPartTimeEmployee in FIG. 12 can be at the same level of nesting.

Example Serialization

Having set forth a number of potential member types, a number of fragment types, and an exemplary set of rules for placing the members in fragments, an example serialization using an embodiment of the serialization format described herein will prove instructive. In this regard, FIG. 3 provides several sample schema. Each schema represents a class of objects, each with one or more members of various types. For the purpose of this discussion, FIG. 3 provides a class of "person" objects, each with a name string (a primitive member), an age integer (also a primitive member), and a locations collection (this is a nested complex member). FIG. 3 also provides a class defining "address" objects, each such object having three primitive members: street, city, and zip. FIG. 3 provides a class of employee objects, which inherits the person class and therefore includes the members of the person class, and also includes three primitive members: employee number, department, and photo (image is a LOB member). The part-time employee class inherits the employee class, and therefore includes all the members of the employee class (including those inherited from the person class), in addition to one primitive, hours per week.

Referring to FIG. 3, consider how an instance of the schemas therein would be serialized using the fragments and rules provided above. An instance of tPerson with a non-empty collection of addresses, for example, can have the following fragments in the following order:

Binary Fragment containing m_name and m_age.
  Collection Start Fragment
  For each collection element:
    Collection Element Fragment with m_street, m_city, m_zip.
  Terminator Fragment to terminate the collection
Terminator Fragment to terminate fragments of tPerson.

An instance of tEmployee with a non-empty collection of addresses can have the following fragments in the following order:

Binary Fragment containing m_name and m_age.
  Collection Start Fragment
  For each collection element:
    Collection Element with m_street, m_city, m_zip.
  Terminator Fragment to terminate the collection
  Subtype fragment containing m_empNo and m_dept
    LOB Fragment containing m_image.
  Terminator Fragment to terminate fragments of tEmployee.
Terminator Fragment to terminate fragments of tPerson.

With reference to the above exemplary fragment sequences, note that for the purpose of supporting reuse of Storage Engine record building/cracking code, as may be desired in those embodiments that make use of a record format in one or more fragments, it is preferable to require that no level of a class for use with the fragment-based serialization techniques described herein may exceed 7 kilobytes (7k) in size. In the example given above, tPerson (excluding the associated collection of addresses) should be less than 7 kilobytes in size. Likewise, each taddress should be less than 7k. Note that while this restriction is disclosed for compliance with statutory requirements for indicating the best mode of practicing the invention, allowing a level to exceed 7k is considered a feasible, though less desirable implementation of the invention. This restriction can be enforced at execution time by a serialization library ("SL"). As will be understood, the serialization is responsible for recognizing and parsing the various fragments.

Note, from the example above, that by placing members in one or more fragments, the task of locating a member involves locating the fragment or fragments in which the member has been placed. If there is more than one such fragment, the first fragment may be located first. In this regard, the position of a fragment relative to the first fragment of a serialization can be determined from metadata. Note that while this technique does not provide for direct addressability of fragments, the task of comparing tokens for each member to identify which aspect of the class an associated member represents is eliminated. Instead, the serialization metadata, when scanned, can quickly direct the processor to an appropriate fragment.

Another advantage of the invention as illustrated in the above exemplary serialization is that serialization of an object can be accomplished in one pass. A serializer process may proceed in a top-down manner, from base type to subtype and containing type to nested type. At each level of nesting, the serializer process may produce one or more fragments. Such a serializer is never required to update a previously generated fragment, though it may be configured to do so if desired.

It will be acknowledged that the serialization format set forth herein can be configured to support fixed, variable length and bit type primitive members; objects nested within other objects; inheritance; inline and out-of-line LOBs (including file streams); ordered collections (providing via the locator function a serialization of collection elements in the appropriate order); unordered collections; and null values. It may also support composable serializations. In this regard, a nested object may be extracted from an existing serialization without a trace of the fragment container in which the object was serialized, i.e., without any state corresponding to its container. This property of embodiments of the invention allows insertion or updating of entire nested objects.

Note also, from the example serialization above, that the proposed serialization format supports adding members to a class without updating any other existing data. The addition of fields to a class is very common in the use of XML schemas, where schemas are frequently updated by adding fields. In this regard, a fragment of any type can be altered to add new members (primitive, collections, or nested objects) as long as they have a default value of NULL and are added to the end of an existing type. And the addition of large members to an object need not be of concern as with record format serialization, because objects stored in the proposed fragment-based format can be stored as a "bag of bytes," in a single column of a database, and can be arbitrarily large.

Yet another advantage of the serialization format as embodied in the example serialization above is that the identity of a fragment need not be stored with the fragment. Instead, the path to a fragment can be used to reveal fragment identity. The path can be determined from the type metadata of any given object that is operated on. A path identifies a particular fragment in a serialization. Path can be, for example a set of numbers at each fragment identifying a fragment at each nesting level and subtype level. Since fields of an object reside in a pre-determined fragment, they can be located using the path. In a sense, paths are like addresses for fragments. A path can be stored along with a fragment or can be computed by navigating from a first serialized fragment. In order to support embedding and nesting of types a path may account for nesting levels and subtype levels.

The fragment-based serialization format also allows for supporting access to members without instantiating the object. Using the path as a fragment identifier, as explained above, the a member location process, or navigator, can navigate to any desired fragment. Once positioned at a fragment, such a process can allow access to the fragment itself or to an entire sequence of fragments rooted at the located fragment. By providing a directory to a serialization in the form of a map to each fragment, locating a fragment can be accomplished even faster. Such a directory can store fragments in a table organized as a BTree. In such an implementation, one fragment may be stored per row, allowing the path to the fragment to be used as part of a key for each row.

A navigator can also efficiently skip fragments that are not of interest for a particular operation. Navigation of the fragments serialized according to the invention may comprise tracking either a number of nesting levels that are open, or a subtype number. Once the navigator arrives at a desired nesting level or subtype, the navigator may count the number of fragments at that level or subtype. Such a fragment could itself start a new level of nesting.

Further to the advantages of locating members of objects which are serialized in a fragment-based format, access to primitive members can comprise the following simple operation. First, a navigator can locate a Binary Fragment. Primitive members, as described above, are advantageously stored in such a fragment. Next, the required member can be extracted using standard, optimized record cracking code. It can also be updated using standard, optimized record building code. This simple operation provides for high-performance location of primitive members in a serialized object that can conveniently be stored in a single database column. An advantage of allowing for member location in this fashion is that, as mentioned above, members may be updated without the need to instantiate an entire host object. This allows for the replacement of a fragment or sequence of fragments without instantiating an entire object. Each fragment can be self-contained, the invention can be configured so the identifier of a fragment sequence is the presence of a begin-nesting fragment and Terminator Fragment. This allows for performance of updates without fixing up lengths anywhere else, and avoids the offset tables of standard record-format serialization.

Storage of a stream of fragments as generated according to the techniques set forth herein may be conducted by storing a stream of fragments as a LOB. Such a LOB may have a tree-structured storage format whose key is an offset location. This technique for storing the stream of fragments provides for a predictable insert and delete time depending on the size of the LOB. It also allow for updating only portions of the LOB. The on-wire format for objects serialized in fragments is the same as the on-disk format with respect to the shape of the fragment headers. In the case of fragments other than the LOB and FS fragments, there need be no change at all for fragments that are on-wire versus on-disk. This aspect of the invention allows objects to be fast-copied onto a wire, providing significant gains in the speed of transporting objects from location to location. Note, however, that fragment contents may vary for LOB and FS fragments to provide for additional flexibility. This aspect of the invention is explained above with the summary of potential fragment types.

Operations on Fragment-Serialized Objects

The simplicity, efficiency, and flexibility of performing operations on an object that is serialized in a given format are effective criteria in evaluating the performance of the serialization format. Embodiments of the invention as described herein are characterized by significant gains in this regard. This may be especially true when operations are performed using the techniques provided in this section. Note, however, that the following list of operations are not considered to be an exhaustive list of possible operations on objects that are serialized according to the techniques of the invention, nor are the descriptions of operation techniques the exclusive manner of performing such operations. The following operations are numbered for ease of reference, and not to indicate any order or sequence in performing the operations. Rather, each of the operations may be performed independently or in conjunction with any other operations.

Figure 9:
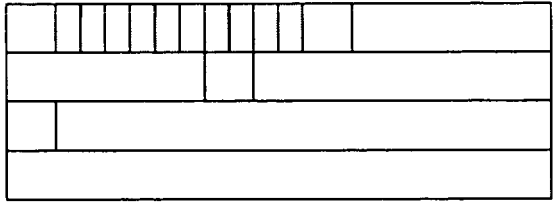
FIG. 9 illustrates objects that have been serialized in accordance with various embodiments of the invention as they may be stored in a single column of a database.

One of the advantages of the present invention is that it allows for storage of an object in a single column of a table in a database, as in FIG. 9, while still permitting high-performance searching and updating capabilities for members within the object. In this regard, FIG. 9 shows an assortment of objects in a single column of a database. In accordance with various embodiments of the invention set forth herein, the objects are serialized with a first fragment that contains primitive members in record format (this is the gray fragment with a subdivided payload), and subsequent fragments that could be any of the fragments set forth in this description. In the following description of operations on serialized objects, refer to FIG. 9 as a reference for the scenario in which embodiments of the invention are stored in a column of a database.

The following exemplary operations will be explained with reference to a generic User-Defined Type ("UDT") object, and a specific implementation of the invention designed for serialization of such an object. Basic algorithms for operations that may be performed on a UDT object stored as fragment stream are provided.

Operation 1: Uniquely identifying an object using its path. When a UDT is stored as a sequence of fragments, every fragment in the sequence can be uniquely identified by a 'path'.

A path is a sequence of steps, where each step can be exactly one of:

1. A nesting step that specifies fragment ID to indicate a non-primitive field: Each non-primitive field of a UDT is assigned a unique fragment ID. Fragment IDs start at 1. This includes Fields inside it that are large objects (LOBs)—such as character/binary data of unbounded or very large length. Each of these fields is stored as a separate fragment.

Fields inside it that are filestreams i.e just a pointer to a file, where the file contains actual data and resides outside the database. Each of these fields is stored as a separate fragment.

Fields inside it that can be another UDT (nesting an UDT inside another is also known as composition of UDTs) or a collection of another UDT. For example UDT A could have a field b of type UDT B. In this case b could be stored as a single self-terminating fragment, or it could be stored as a sequence of fragments if B has non-primitive fields or is a subtype of another UDT.

Note that when assigning fragment IDs, we need not consider non-primitive fields inherited from super types. So, if UDT Q is a subtype of UDT P, when assigning fragment IDs to non-primitive fields of UDT Q, we do not consider fields of P even though Q inherits all those fields.

Also, note that the non-primitive fields of a UDT are laid out in the increasing order of their fragment IDs.

2. An inheritance step that specifies depth: This tells which subtype section the fragment is located in. Recall that primitive and non-primitive fields of base type are laid out before that of the subtype. Suppose that UDT R is a subtype of UDT Q, which is a subtype of UDT P. Layout of an object of type R would look as follows:

[Fragment for primitive fields of P]

... Zero or more fragments for non-primitive fields of P ...

[Fragment for primitive fields of Q]// this begins section for Q

... Zero or more fragments for non-primitive fields of Q ...

[Terminator for Q if needed]
[Fragment for primitive fields of R]// this begins section for R
... Zero or more fragments for non-primitive fields of R...
[Terminator for R if needed]
Inheritance step specifying depth of 2 would indicate section for Q and inheritance step specifying depth of 3 would indicate section for R. No inheritance step is needed to indicate section for P.

3. A collection member step that specifies a locator: (Locator uniquely identifies a member of a collection. Members of a collection are assigned locators starting from 1. When a collection member is deleted, it causes a 'gap' in the locators, and a subsequent member insert reuses the locator. So, if no members were ever deleted, members of a collection with N members will have locators 1 thru N.) Recall that if UDT A is a collection of UDT C, the an object of type A containing two members would look as follows:
[Fragment to indicate start of collection]
[Fragment to indicate start of member1]// this has locator for member1
... 0 or more fragments if needed for nested types, subtypes of member1 ...
[Terminator for member1 if needed]
[Fragment to indicate start of member2 ]// this has locator for member2
... 0 or more fragments if needed for nested types, subtypes of member2 ...
[Terminator for member2 if needed]
[Terminator for collection]
Collection member step specifying locator for member1 would indicate section for member1, while a collection member step specifying locator for member2 would indicate section for member2.

Any fragment in a complex UDT can be uniquely located with an appropriate permutation of nesting steps, locator steps and inheritance steps.

A path consisting of n steps S1, S1, S2, ..., Sn in that order is denoted as S1.S2 ... Sn. Also, if P is a path, we use the notation size(P) for the #steps in P, and P[i] for ith step of P, where i >0.

Operation 2, Implementing a fragment stream over a byte stream. Databases have been supporting character/binary data of bounded and unbounded lengths for many years. Providing byte stream interfaces on top of character/binary data is a known technology. Byte stream interface includes methods such as
1. Reading 'n' bytes starting at some specified offset 's'.
2. Inserting 'n' bytes starting at some specified offset 's'. Conceptually, the pre-existing data starting at offset 's' is shifted by 'n' bytes and the 'gap' created is filled with the supplied 'n' bytes. However, when the byte stream is large, implementations are smart enough not to actually shift huge amounts of data. They achieve it using an index structure built on top of the byte stream.
3. Variation of 1 where data being read is requested in the form of an object that supports byte stream interface.
4. Variation of 2, where new data to be inserted is provided in the form of another object that supports byte stream interface.
5. Replacing 'n' bytes starting at some specified offset 's' with the supplied data. Note that the supplied data could be 'empty', in which case the effect is that of removing 'n' bytes starting at offset 's'.
6. Variation of 5, where new data is supplied in the form an object that supports byte stream interface.

Note that above list is intended to be representative but not exhaustive. As mentioned before, a UDT is stored as a fragment stream. The fragment stream can be implemented on top of a byte stream.

Operation 3: Locating a fragment from path information. Consider a fragment stream representing a UDT. This section explains how to locate a fragment in it given its path.

If the path is valid, the fragment corresponding to the path must be found, except when a null UDT is encountered halfway through, in which case we can not traverse further and the fragment can be considered not found. For example, when looking for 'manager' field inside a 'department' UDT, if the fragment for 'department' object itself is a null fragment, then this method returns FALSE to indicate that the fragment for 'manager' is not found.

Note that schema evolution introduces another situation where the fragment corresponding to a path can be missing even if the path is valid. Here is the basic algorithm of LocateFragment. Initially, currentPath in the FragmentStream object is an empty path, and the current fragment is the first fragment.

```
BOOLEAN
    FragmentStream::LocateFragment(Path targetPath)
{
    // Suppose that targetPath has N steps, and kth step is Sk.
    // At the end of iteration i of this loop, current path would be
    // S1.S2....Si.
    //
    For (i = 1; i <= N; i++)
    {
        // Encountered null UDT at this level. The target path has
        more steps,
        // but we can't traverse further. Return not found.
        //
        If (current fragment is null fragment)
            Return FALSE;
        // This will move to the first fragment at next level
        // so that a new step will get added to current path
        // and it will have i steps.
        //
        GetNextFragment( ); // see section 0
        // This will keep advancing until ith step of currentPath
        // matches ith step of targetPath.
        //
        AdvanceTillStep(i, targetPath); // see section 0
    }
    // Found it and we are current positioned on it.
    Return TRUE;
}
```

FragmentStream::AdvanceTillStep( ). Further to locating a fragment, the "advance till step" operation may also be used. This method compares two steps according to the following rules. First, a 'nesting step' is less than another 'nesting step' if fragment ID in the former is less than that in the later. Second, an 'inheritance step' is less than another 'inheritance step' if depth in the former is less than that in the latter. Third, a 'locator step' is less than another 'locator step' if the locator in the former is less than that in the latter. Fourth, a 'nesting step' is always less than 'inheritance step' (as we store all nested fields before the fields from subtypes). Finally, a 'locator step' is incomparable with 'nesting step' or an 'inheritance step' and it is an error to attempt such a comparison. For example, refer to the following algorithm:

```
// Pre-condition: First i-1 steps of current path already match those from
target
// Path and ith step is as not larger than that in targetPath.
//
// Post-condition: First I steps of current path match those from target
path.
//
FragmentStream::AdvanceTillStep(Step# I, Path targetPath)
{
    While (currentPath[i] < targetPath[i])
    {
        // This updates currentPath appropriately
        //
        GetNextFragment( ); // see section 0
    }
}
```

FragmentStream::GetNextFragment( ). Further, a get next fragment operation may be implemented as follows:

```
FragmentStream::GetNextFragment( )
{
    S = last step in currentPath or NULL if currentPath is empty;
    prevFragment = currentFragment;
    // Advancing to next fragment is done by doing
    // current position = current position + current fragment length
    //
    Move to next fragment
    If (prevFragment is self-terminating)
    {
        If (current fragment is for nested field)
            Increment fragment ID in S // S must be nesting step
        Else if (current fragment is for subtype)
        {
            If S is nesting step then
                S = inheritance step with depth = 2
            Else
                // S must be inheritance step
                Increment depth in S
        }
        Else if (current fragment is for collection member)
        {
            // S must be locator step
            S = locator step with locator value taken from this member
        }
        Else if (current fragment is terminator)
            Remove step S from current Path
    }
    Else
    {
        Add a new step S1 initialized as follows
        If (current fragment is for nested field)
            S1 = nesting step with fragment ID = 1
        Else if (current fragment is for subtype)
        {
            S1 = inheritance step with depth = 2
        }
        Else if (current fragment is for collection member)
        {
            S1 = locator step with locator value taken from this member
        }
        Else if (current fragment is terminator)
        {
            // No need for S1
            Remove step S1 from current Path
        }
    }
}
```

Operation 4: Selecting a primitive field. Selection of a primitive field involves first locating the fragment containing the primitive field using its path. The payload of this fragment is in record format and has the primitive field. Next, one can use standard optimized record manipulation code to extract the primitive field from the payload.

Operation 5: Updating a primitive field. Updating a primitive field can be accomplished in three steps: First, locate the fragment containing the primitive field using its path in the same way as selecting a primitive field. Next, make a copy of the payload of the fragment and use standard optimized record manipulation code to replace the old value of the primitive field that needs to be updated with the new value. This gives a new payload, which could be longer or shorter than the original payload. Third, update the fragment by replacing old payload with the new payload. Note that this may increase or decrease the length of fragment and its length will have to adjusted accordingly.

Operation 6: Copying an entire embedded UDT. Copying out an entire embedded UDT involves first using locateFragment( ), set forth above, to locate the fragment that marks the beginning of the embedded UDT from a path of the embedded UDT. Second, one can use a CopyOutFragmentSequence( ) function explained below to copy out the fragments belonging to the embedded UDT.

Further to copying a UDT, a FragmentStream::CopyOutFragmentSequence( ) function may be employed, using the following basic algorithm:

```
// Pre-condition: Currently positioned on the fragment marking
the beginning of
// embedded UDT. currentPath in FragmentStream object gives the
path of the embedded //
UDT.
//
// Copies the fragment stream representing the embedded UDT to
the destination
// FragmentStream
//
FragmentStream::CopyOutFragmentSequence(FragmentStream
destination)
{
    Terminated = FALSE;
    pathToThisUDT = currentPath; // Remember the path to
    this UDT.
    While (1)
    {
        If (this is the first fragment being copied) &&
            (this fragment is self-terminating)
                Terminated = TRUE;
        // Note: If this the first fragment being copied and
        is collection member
        // fragment, then strip off the locator and copy as
        a binary fragment
        //
        Copy current fragment to destination
        If (Terminated)
            Break;
        // Note that this will change current path, current
        fragment etc
        //
        GetNextFragment( );
        // CanContinueNavigation determines whether to copy
        this fragment.
        // It may also set terminated to TRUE. Explained
        below.
        //
        If (CanContinueNavigation(pathToThisUDT, Terminated))
        {
            Continue;
        }
    }
}
```

Still further, a continue navigation function "FragmentStream::CanContinue Navigation( )" can follow this basic algorithm:

```
// Given the path to nested UDT that we are in the process of
copying, and the
// current path (available in the state of FragmentStream),
this method determines
// whether to copy next fragment. Also, it sets lastFragment
to TRUE if the next
// fragment is the last fragment to copy.
//
BOOLEAN
FragmentStream::CanContinueNavigation(Path pathToThisUDT,
    BOOLEAN lastFragment // OUTPUT parameter)
{
    If (size(currentPath) == size(pathToThisUDT))
    {
        // In this case only terminator fragment is left
        to copy
        lastFragment = TRUE;
        Return TRUE;
    }
    // Else, #steps in current path must be MORE than in
    pathToThisUDT
    // indicating that current fragment is nested inside UDT
    we are copying
    //
    Return TRUE;
}
```

Operation 7: Removing All Fragments of a Embedded UDT. Similar to CopyOutFragmentSequence( ), a method DeleteFragmentSequence( ) is provided to delete all the fragments belonging to an embedded UDT. For each fragment, the underlying ByteStream class can be used to remove the bytes for that fragment. Special processing is needed if the fragment is filestream fragment to actually delete the underlying file.

Operation 8: Updating an embedded UDT with a new UDT. An algorithm referred to by the inventors as "FragmentStream::ReplaceFragmentSequence( )" can first locate an embedded UDT using its path, next use DeleteFragmentSequence( ) to delete all the fragments that belong to the embedded UDT, and finally read the fragments for the new UDT and insert them at the current location. Again, the underlying ByteStream class can be used to put the bytes for the new fragment. Special processing is needed to insert filestream fragment as the file needs to be created with the proper data, and pointer to that file needs to be put in the fragment.

Operation 9: Inserting a collection member. Consider inserting a UDT object A, supplied in the form a FragmentStream object, as a member of a collection in a FragmentStream object representing object B. The following algorithm is referred to by the inventors as FragmentStream::InsertCollectionElement( ):first, locate the collection in the B using path to the collection. Next, find a locator and position of insert. As mentioned in earlier, if a collection member was deleted earlier, it results in a 'gap' in the locators. If any such gap exists, the unused locator is assigned to the new member and it is inserted such that all members are laid out in increasing order of locators. Otherwise, the new member is assigned a locator that is 1 more than last member and is inserted after the last member. Note that the first fragment of A will have to be modified to put the locator in it.

Operation 10: Deleting a collection member. An algorithm referred to by the inventors as "FragmentStream::DeleteCollectionElement( )" can specify a member to delete is using its locator. Deletion involves first locating the collection using its path, and next locating the member to delete within the collection. Note that this is a simpler problem that locating a fragment given its path, because we are just dealing with locator step here. So similar logic as in LocateFragment method can be used for this. Next, call DeleteFragmentSequence once we are positioned on the first fragment belonging to the member to delete.

Operation 11: Updating an entire collection or a single collection member. Replacement of an entire collection with a different collection is done in the same way as replacing an embedded UDT with another UDT. Similarly, once a collection member has been located, updating it can be done in the same way as updating an embedded UDT.

Operation 12: Selecting or updating multiple fields of a UDT. When selecting or updating multiple fields, the following optimizations are performed: First, ordering the selects/updates. Comparison and ordering of two steps has been explained above. Path can be considered as a string of steps and a 'lexicographical' ordering can be defined on paths. Refer to the following algorithm:

```
INT
ComparePaths(Path P1, Path P2)
{
    minSteps = MIN (size(P1), size(P2))
    for (i = 1; i <= minSteps; i++)
    {
        If (P1[i] < P2[i])
            Return -1; // P1 < P2
        Else if (P1[i] > P2[i])
            Return 1; // P1 > P2
    }
    // first minSteps match for both
    If (size(P1) < size(P2))
        Return -1; // P1 < P2
    Else if (size(P1) > size(P2))
        Return 1; // P1 > P2
    Else
        Return 0; // P1 = P2
}
```

Fields are selected or updated in the increasing order of the paths to the fragments containing them. Note that this ordering is the same order in which the fragments appear in the fragment stream. Multiple primitive fields could be located in the same fragment. In such a case, once the fragment containing them is visited, the standard record manipulation code is used to select or update all desired fields efficiently, without the need to visit the fragment again. By doing the above, even in a complex UDT, at most one pass is required over its fragment stream to select or update all the desired fields of that UDT.

Operation 13: Enhancing LocateFragment to make use of current position. The previous depiction of LocateFragment algorithm always started at the beginning of fragment stream. However, LocateFragment needs to start from the beginning only for locating the fragment containing the first field that needs to be selected or updated. For locating the fragment containing subsequent fields that need to be selected or updated, locateFragment can start from the current position. Enhancements needed to LocateFragment are briefly mentioned below. There are two basic cases here:

1. currentPath==prefix(targetpath) i.e all steps in currentPath match those of targetPath, but the target path has some additional steps. In this case, locateFragment can start from iteration for I=size(currentpath)+1 instead of starting from the iteration for i=0.
2. For some k<sizeof(currentPath), first k steps of currentPath match that of targetPath, but the k+$1^{st}$ step does not. Note that in this case, currentPath[k+1] has to be<targetPath[k+1] since paths would have already been sorted in increasing order. In this case also locateFragment can start from AdvanceTillStep in iteration for i=k+1.

Operation 14: Lazy Materialization. When sending a serialization of a UDT from server to client, sending LOB data and file data from filestream fields tend to be the most time consuming factor. So the fragment stream manager can provide a 'lazy materialization' option.

When the serialization of a UDT is requested with lazy materialization option, 'cookies' are returned in place of LOB/filestream data. Caller can subsequently ask for the full LOB/filestream data by passing the path of the LOB/filestream fragment and the 'cookie'. The path and the cookie will give enough information for the fragment stream manager to retrieve the LOB/filestream data.

Operation 15: Schema Evolution. Schema evolution refers to changing the UDT by adding, removing, or modifying fields (such as changing data type of a field) of a UDT, or changing the inheritance hierarchy by defining new UDTs etc. Such changes may impact instances of UDT that have already been persisted. A simple solution is to ensure that any field IDs and fragment IDs assigned to existing fields continue to remain the same when new fields are added. Then, addition of new fields to a UDT can be supported without modifying any pre-existing persisted instances of the UDT.

Finally, it should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the user interface techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments refer to utilizing the present invention in the context of one or more stand-alone computer systems, the invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes. Therefore, the present invention should not be limited to any single embodiment, but rather should be construed in breadth and scope in accordance with the appended claims.

Appendix A: Fragment Validation Processes

The following algorithms are descriptive of top-level computer process commands that can be used to validate fragments.

```
class Fragment
{
public:
    //-----------------------------------------------------------
    // FragType and FragTypeModifiers are stored in the first byte
    //-----------------------------------------------------------
    enum _FragType
    {
        FragType_Invalid = 0,
        FragType_Binary = 1,
        FragType_Lob = 2,
        FragType_Fs = 3,
        FragType_CollectionStart = 4,
        FragType_Terminator = 5,
        // 6 – 7 are unused
        FragType_Max = 7,
    FragType_Bits = 3,
    FragType_Mask = 0x7,
    };
    enum _FragTypeModifiers
    {
        TypeMod_CollectionElement = 0x8,
        TypeMod_SelfTerminator = 0x10,
        TypeMod_NullFragment = 0x20,
        TypeMod_Subtype = 0x40,
        TypeMod_Max = 0xF0,
        TypeMod_Mask = 0xF8,
    };
    //-----------------------------------------------------------
    // End of first byte enums
    //-----------------------------------------------------------
    //-----------------------------------------------------------
    // Additional bits are stored in the second byte.
    //-----------------------------------------------------------
    enum _LobFsValueType
    {
        ValueType_Pointer = 1,
        ValueType_Inlined = 2,
        ValueType_Delayed = 3,
    };
    DECLARE_SAFE_ENUM (_LobFsValueType, LobFsValueType);
    enum _CollectionType
    {
        CollType_Unordered = 1,
    };
    //-----------------------------------------------------------
// End of second byte enums
    //-----------------------------------------------------------
};
```

An alternate layout for fragment validation code is described below, where the grammar of a serialization is illustrated in Backus Naur Form ("BNF").

A symbol in quotes "" is a terminal. For example "self-terminating bin frag" represents a terminal. The various terminal symbols are defined in the previous section.

A symbol in angle brackets < > represents a non-terminal. For example, <containment frag> is a non-terminal.

A symbol in curly braces { } indicates that symbol may be repeated zero or more times. For example, {<containment frag>} indicates there may be zero or more instances of <containment frag>.

Annotation fragments can exist anywhere in the stream.

```
<udt_serialization> ::= "self-terminating bin frag" |
        <explicitly terminated bin frag>
    <explicitly terminated bin frag> ::= "open-ended bin frag"
```

-continued

```
            <nested frag>
            "terminator frag"
<nested frag> ::=
    <containment frag> { <containment frag> } |
    < subtype frag> { < subtype frag> } |
    <containment frag>
    { <containment frag> }
    <subtype frag>
    { <subtype frag> }
< containment frag> ::= <LOB/FS frag> |
        <udt_serialization> |
        <collection>
<subtype frag> ::= "self-terminating subtype bin frag" |
        <explicitly terminated subtype bin frag>
<explicitly terminated subtype bin frag> ::=
    "open-ended subtype bin frag"
    { <containment frag> }
    "terminator frag"
<LOB/FS frag> ::= "null LOB/FS frag" |
    "LOB/FS as pointer frag" |
    "LOB/FS as delayed reference frag" |
    "LOB/FS as inlined frag"
<collection> ::=
    { <null collection start frag> } |
    "collection start frag"
    <collection element > { <collection element > }
    "terminator frag"
<coll element binfrag> ::=
    "null collection element binfrag" |
    "self-terminating collection element binfrag" |
    <explicitly terminated collection element binfrag>
<explicitly terminated collection element binfrag> ::=
    "open-ended collection element binfrag"
    <nested frag>
    "terminator frag"
<annotation frag> ::= "self-terminating frag"
```

What is claimed:

1. A method for storing or transmitting a data object made of one or more data members, comprising:

dividing a plurality of sequentially located bytes in a computing device into at least one header section and at least one payload section;

representing at least one data member in the payload section, said at least one data member being associated with a data type, the data type having multiple sub-types, the data type being associated with a value type, the data type specifying a predefined type of the at least one data members, the value type further specifying the predefined type of the at least one data member as one of the multiple sub-types of the data type of the at least one data member, and describing the at least one data member by including at least one attribute of the at least one data member, the at least one data member having a length and having a related data member, the related data member being locatable by locator information;

representing the data type of the at least one data member in the header section;

representing the value type of the at least one data member in the header section, the at least one data member being associated with the value type;

representing the length of the at least one data member in the header section, the length being required in the header section by at least one of the represented data type and the represented value type;

representing the locator information of the at least one data member in the header section, the locator information being required in the header section by at least one of the represented data type and the represented value type;

placing the at least one data member in the payload section in a record format, wherein the record format defines a predictable location for said at least one data member in relation to any other members in the payload section; and storing the data object with the at least one data member in the payload section thereof and the data type, value type, length, and locator information in the header section thereof in a computer-readable storage medium.

2. The method of claim 1, wherein the at least one data member is associated with a primitive data type.

3. The method of claim 1, further comprising representing a payload length in the header section.

4. The method of claim 1, further comprising:

further dividing the plurality of sequentially located bytes into at least one second header section and at least one second payload section, wherein said at least one second header section and said at least one second payload section are located proximally to each other; and representing location information for the at least one second data member in the at least one second payload section, wherein the location information specifies a location of a location type; and identifying the location type in the second header section.

5. The method of claim 4, further comprising placing a LOB type data member in the at least one second payload section.

6. The method of claim 4, further comprising placing a FS type data member in the at least one second payload section.

7. The method of claim 4, further comprising representing a payload length in the at least one second header section.

8. The method of claim 1, further comprising:

further dividing the plurality of sequentially located bytes into at least one second header section; and marking with said at least one second header section the start of a collection of related data members located substantially proximally to said at least one second header section.

9. The method of claim 8, further comprising indicating in said at least one second header section whether the collection of related data members is ordered or unordered.

10. The method of claim 1, further comprising:

further dividing the plurality of sequentially located bytes into at least one second header section; and marking with said at least one second header section the end of the data object.

11. A computer readable storage medium bearing instructions for storing or transmitting a data object made of one or more data members, comprising:

instructions for dividing a plurality of sequentially located bytes in a computing device into at least one header section and at least one payload section;

instructions for representing at least one data member in the payload section, said at least one data member being associated with a data type, the data type having multiple sub-types, the data type being associated with a value type, the data type specifying a predefined type of the at least one data member, the value type further specifying the predefined type of the at least one data member as one of the multiple sub-types of the data type of the at least one data member, and describing the at least one data member by including at least one attribute of the at least one data member, the at least one data member having a length and having a related data member, the related data member being locatable by locator information;

instructions for representing the data type of the at least one data member in the header section;

instructions for representing the value type of the at least one data member in the header section, the at least one data member being associated with the value type;

instructions for representing the length of the at least one data member in the header section, the length being required in the header section by at least one of the represented data type and the represented value type;

instructions for representing the locator information of the at least one data member in the header section, the locator information being required in the header section by at least one of the represented data type and the represented value type; and instructions for placing the at least one data member in the payload section in a record format, wherein the record format defines a predictable location for said at least one data member in relation to any other members in the payload section.

12. The computer readable storage medium of claim 11 wherein the at least one data member is associated with a primitive data type.

13. The computer readable storage medium of claim 11, further comprising instructions for representing a payload length in the header section.

14. The computer readable storage medium of claim 11, further comprising:

instructions for further dividing the plurality of sequentially located bytes into at least one second header section and at least one second payload section, wherein said at least one second header section and said at least one second payload section are located proximally to each other;

instructions for representing location information for the at least one second data member in the at least one second payload section, wherein the location information specifies a location of a location type; and instructions for identifying the location type in the second header section.

15. The computer readable storage medium of claim 14, further comprising instructions for representing a payload length in the at least one second header section.

16. The computer readable storage medium of claim 11, further comprising:

instructions for further dividing the plurality of sequentially located bytes into at least one second header section; and instructions for marking with said at least one second header section the start of a collection of related data members located substantially proximally to said at least one second header section.

* * * * *

UNITED STATES PATENT AND TRADEMARK OFFICE
CERTIFICATE OF CORRECTION

| | | |
|---|---|---|
| PATENT NO. | : 7,702,637 B2 | Page 1 of 1 |
| APPLICATION NO. | : 11/154496 | |
| DATED | : April 20, 2010 | |
| INVENTOR(S) | : F. Soner Terek et al. | |

It is certified that error appears in the above-identified patent and that said Letters Patent is hereby corrected as shown below:

In column 2, line 28, delete "object" and insert -- object. Instantiating the entire person object, for example, only to read or update the person's social --, therefor.

In column 25, line 45, in Claim 1, delete "members," and insert -- member, --, therefor.

Signed and Sealed this
Eighth Day of February, 2011

David J. Kappos
*Director of the United States Patent and Trademark Office*